United States Patent [19]

Delgado

[11] Patent Number: 4,988,567
[45] Date of Patent: Jan. 29, 1991

[54] HOLLOW ACID-FREE ACRYLATE POLYMERIC MICROSPHERES HAVING MULTIPLE SMALL VOIDS

[75] Inventor: Joaquin Delgado, St. Paul, Minn.

[73] Assignee: Minnesota Mining and Manufacturing Company, St. Paul, Minn.

[21] Appl. No.: 547,282

[22] Filed: Jul. 25, 1990

Related U.S. Application Data

[62] Division of Ser. No. 485,630, Feb. 27, 1990, Pat. No. 4,968,562.

[51] Int. Cl.$^5$ .............................................. B32B 5/16
[52] U.S. Cl. ...................................... 428/402; 521/56; 521/60; 521/63; 521/64; 523/223; 524/801
[58] Field of Search ................ 428/402; 524/801; 523/223; 521/56, 60, 63, 64

[56] References Cited

U.S. PATENT DOCUMENTS

| | | | |
|---|---|---|---|
| 3,468,820 | 9/1969 | Buchholtz et al. | 521/56 |
| 3,615,972 | 10/1971 | Morehouse, Jr. | 521/56 |
| 3,620,988 | 11/1971 | Cohen | 260/17.4 |
| 3,691,140 | 9/1972 | Silver | 260/78.5 |
| 3,857,731 | 12/1974 | Merrill et al. | 117/122 PA |
| 4,166,152 | 8/1979 | Baker et al. | 428/522 |
| 4,495,318 | 1/1985 | Howard | 524/375 |
| 4,598,112 | 7/1986 | Howard | 524/78 |
| 4,645,783 | 2/1987 | Kinoshita | 523/221 |
| 4,656,218 | 4/1987 | Kinoshita | 524/460 |
| 4,735,837 | 4/1988 | Miyasaka et al. | 428/40 |
| 4,786,696 | 11/1988 | Bohnel | 526/88 |

FOREIGN PATENT DOCUMENTS 3544882 11/1986 Denmark .
209337 1/1987 European Pat. Off. .

OTHER PUBLICATIONS

U.S. Statutory Invention Registration H509, Inventor: Chao, Published Aug. 2, 1988.

Primary Examiner—Morton Foelak
Attorney, Agent, or Firm—Donald M. Sell; Walter N. Kirn; Darla P. Neaveill

[57] ABSTRACT

Hollow, polymeric, acrylate, infusible, inherently tacky, solvent-insoluble, solvent-dispersible, elastomeric, nitrogen-containing, acid-free pressure-sensitive adhesive microspheres having an average diameter of at least about 1 micrometer wherein a majority of the microspheres contain multiple interior voids, a majority of the voids having a diameter of less than about 10% of the diameter of the microsphere, the total of the diameters of the voids being at least about 10% of the diameter of the microsphere.

These hollow microspheres are useful as repositionable pressure-sensitive adhesives. The invention also provides pressure-sensitive adhesives consisting essentially of such acid-free hollow microspheres. Aqueous suspensions of these microspheres, processes for their preparation, spray repositionable pressure-sensitive adhesive compositions, and pressure-sensitive adhesive coated sheet materials are also provided. Surprisingly, hollow microspheres of the invention may be used in combination with delicate substrates such as photographs without causing discoloration or damage, in comparison with prior art repositionable pressure-sensitive adhesives.

8 Claims, No Drawings

HOLLOW ACID-FREE ACRYLATE POLYMERIC MICROSPHERES HAVING MULTIPLE SMALL VOIDS

This is a division of application Ser. No. 485,630, filed Feb. 27, 1990, now U.S. Pat. No. 4,968,562.

FIELD OF THE INVENTION

This invention relates to hollow, polymeric, acrylate, infusible, inherently tacky, elastomeric solvent-dispersible, solvent insoluble, nitrogen-containing, acid-free microspheres, to processes for their preparation, and to their use as repositionable pressure-sensitive adhesives.

BACKGROUND OF THE INVENTION

Description of the Related Art

Solid, inherently tacky, elastomeric microspheres are known in the art to be useful in repositionable pressure-sensitive adhesive applications As used herein, the term "repositionable" refers to the ability to be repeatedly adhered to and removed from a substrate without substantial loss of adhesion capability. Microsphere-based adhesives are thought to perform well in such applications at least in part due to their "self-cleaning" character, wherein substrate contaminants tend to be pushed aside and trapped between the microspheres as the adhesive is applied. Upon removal, the adhesive can then still present a relatively uncontaminated surface for reapplication to the substrate. However, problems with microsphere loss, i.e., microsphere transfer to the substrate, and the resultant need for use of a primer or binder have been recognized in the art.

Numerous references concern the preparation and/or use of inherently tacky, elastomeric acrylate polymeric microspheres which are solid in nature. Such spheres and their use in aerosol adhesive systems having repositionable properties are disclosed in U.S. Pat. No. 3,691,140 (Silver). These microspheres are prepared by aqueous suspension polymerization of alkyl acrylate monomers and ionic comonomers, e.g., sodium methacrylate, in the presence of an emulsifier, preferably an anionic emulsifier. The use of a water-soluble, substantially oil insoluble ionic comonomer is critical to preventing coagulation or agglomeration of the microspheres.

U.S. Pat. No. 4,166,152 (Baker et al.) describes solid, inherently tacky (meth)acrylate microspheres which are prepared from non-ionic alkyl acrylate or methacrylate monomer(s) in the presence of both an emulsifier and an ionic suspension stabilizer having an interfacial tension sufficient to prevent microsphere agglomeration. Such microspheres are also disclosed in U.S. Pat. Nos. 4,495,318 and 4,598,112 (Howard), where the preparative methods involve the use of a nonionic emulsifier or a cationic emulsifier. All three patents disclose utility as a "reusable adhesive".

U.S. Pat. No. 4,786,696 (Bohnel) describes a suspension polymerization process for preparing solid, inherently tacky (meth)acrylate microspheres which does not require the use of either an ionic comonomer or an ionic suspension stabilizer in order to prevent agglomeration. Rather, the process requires agitation of the vessel charge prior to the initiation of the reaction sufficient to create a suspension of monomer droplets having an average monomer droplet size of between about 5 and about 70 micrometers. In addition to (meth)acrylate monomer, a minor portion of a non-ionic, vinylic comonomer such as, e.g., acrylic acid may be included to modify the "tacky nature" of the microspheres.

U.S. Pat. No. 3,620,988 (Cohen) discloses a method of preparing "bead-type polymers" which involves the use of a water-insoluble polymeric thickening dispersing agent. The method can be applied to produce coatable bead suspensions which can be formed into continuous films having pressure-sensitive adhesive properties.

U.S. Pat. No. 4,735,837 (Miyasaka et al.) discloses a detachable adhesive sheet having an adhesive layer containing "elastic micro-balls", wherein the microballs partially protrude from the surface of the adhesive layer. The microballs may or may not be tacky. They can be derived from, e.g., (meth)acrylate monomer and an α-olefinic carboxylic acid monomer via suspension polymerization in an aqueous medium. However, no details as to the nature of the surfactants utilized, etc., are disclosed The microballs and an adhesive are dispersed in solvent, mixed, and coated, with the ratio of adhesive to microballs being from about 1:10 to about 10:1; This ratio is disclosed to be critical in order that all microballs in the final product, including those protruding from the surface, are completely covered with the adhesive. A range of 1,000 to 150,000 pieces per square centimeter is disclosed as preferred.

DE 3,544,882 A1 (Nichiban) describes crosslinked microspheres composed of 90 to 99.5 weight percent of (meth)acrylate ester and 10 to 0.5 weight percent of vinyl type monomer, e.g., acrylic acid, having a reactive functional group through which crosslinking is achieved by reaction with an oil-soluble crosslinking agent. The microspheres are prepared by dispersing in water a solution (in organic solvent) of copolymer prepared by known methods such as solution, bulk, emulsion, or suspension polymerization. (However, the reference notes that in cases where emulsion or suspension polymerization is used with water as a dispersion medium, it is not necessary to make a new aqueous dispersion.) When tacky, the spheres are said to be useful in spray or coated sheet form as "removable adhesive". The stated purpose of the invention is to provide microspheres having a uniform particle size, but it is also stated that the microspheres may contain other monomers such as vinyl acetate, styrene, acrylonitrile, methacrylonitrile, etc., "... to prevent partial transfer of the adhesive when the carrier (backing) is pulled away from the substrate ...".

U.S. Pat. Nos. 4,645,783 and 4,656,218 (Kinoshita) disclose a "repeatedly usable and releasable sheet" coated with an aqueous suspension of microspheres obtained by aqueous suspension polymerization (in the presence of a protective colloid comprising casein as a main ingredient) of one or more alkyl(meth)acrylate esters, one or more α-monoolefin carboxylic acids, and one or more other vinyl monomers. The microspheres are preferably interspersed with finer polymer particles prepared by polymerization of one or more vinyl monomers in an aqueous medium. These fine polymer particles are said to be "... effective in improving the anchorage to the adherend and the adhesion to the substrate after the aqueous suspension prepared in accordance with the present invention is applied to the substrate".

U.S. Pat. No. 3,857,731 (Merrill et al.) and EP 209337 (Smith & McLaurin) both address problems with microsphere adhesive transfer. The former discloses sheets coated with the tacky elastomeric copolymer microspheres of the Silver patent and a binder material which provides sockets in which the microspheres are held by predominately mechanical forces. The latter states that microsphere adhesives could be put to more demanding applications if it were not for the drawback of adhesive transfer. Tacky, elastomeric microspheres are then described which have a composition formed from nonionic monomers alone or together with a proportion of ionic comonomers. The microspheres further comprise an adhesion promoting monomer having functionality which remains unreacted during polymerization of the monomers and is available for subsequently binding the microspheres through electrostatic interaction or chemical bonding to a substrate or binder-coated substrate. Preferably, the microspheres are derived from at least one alkyl acrylate or methacrylate ester.

U.S. Statutory Invention Registration H509 (Chao) discloses acrylate microparticle adhesives wherein the level of tack is varied by adjusting the type and ratio of monomers used in the starting solution. Very high tack is said to be achieved when isodecylacrylate and 2 ethyl hexylacrylate are used in combination with acrylic acid, vinyl pyrrolidone, and isoboryl acrylate.

It is an object of this invention to provide an acid-free microsphere-based, repositionable pressure-sensitive adhesive for use where acids would cause problems with the substrate such as discoloration, i.e., photographs.

It is a further object of this invention to provide an elastomeric microsphere-based, repositionable pressure-sensitive adhesive which exhibits good shear adhesion, enabling the adhesive to support heavy objects.

It has now been discovered that these objects, and others, which will become apparent from the following discussion may be achieved by preparing hollow microspheres having multiple small voids which, in addition to being inherently tacky, elastomeric, infusible, solvent-insoluble, and solvent-dispersible, are also nitrogen containing and acid-free.

SUMMARY OF THE INVENTION

This invention provides hollow, polymeric, acrylate, inherently tacky, infusible, solvent-insoluble, solvent-dispersible, elastomeric, acid-free pressure-sensitive adhesive microspheres having diameters of at least about one micrometer. A majority of the microspheres contain multiple interior voids, a majority of the voids having a diameter of less than about 10% of the diameter of the microsphere, the total of all void diameters being at least about 10% of the diameter of the microsphere. These microspheres are useful as repositionable pressure-sensitive adhesives.

The invention also provides pressure-sensitive adhesives based on the acid-free hollow microspheres, aqueous suspensions of these microspheres, processes for their preparation, spray repositionable pressure-sensitive adhesive compositions, and pressure-sensitive adhesive-coated sheet materials.

Repositionable pressure-sensitive adhesives based on nitrogen-containing, acid-free microspheres having multiple small voids can be used even on such delicate substrates as photographs, graphics, silk-screened printed matter, and the like, which would discolor if used with conventional, acid-containing repositionable pressure sensitive adhesives.

It has been discovered that increasing the amount of N-containing polar monomer results in higher shear adhesion without detrimental effect on the other pressure-sensitive adhesive properties. Thus, adhesives of the invention comprising higher, i.e., 15-25 parts of the N-containing polar monomer exhibit greater shear adhesion for a given coating weight of adhesive than prior art systems. The hollow acid-free microspheres of this invention are also highly adherent to substrates on which they are coated, and, thus, generally require neither separate primer or binder material.

This invention also provides a pressure-sensitive adhesive consisting essentially of these nitrogen-containing, acid-free hollow microspheres. More specifically, the pressure-sensitive adhesive consists essentially of hollow, polymeric, acrylate, inherently tacky, infusible, solvent-insoluble, solvent-dispersible, elastomeric, nitrogen-containing, acid-free microspheres comprising:

(a) at least about 70 parts by weight of at least one alkyl acrylate or alkyl methacrylate ester; and (b) up to about 30 parts by weight of at least one nitrogen-containing polar monomer, a majority of the microspheres having multiple interior voids, a majority of the voids having a diameter of less than about 10% of the diameter of the microsphere, the total of all void diameters being at least about 10% of the diameter of the microsphere.

These hollow acid-free microspheres may be prepared by a two step emulsification polymerization process comprising the steps of:

(a) forming a water-in-oil emulsion of an aqueous solution of nitrogen-containing polar monomer(s) in oil phase monomer(s);

(b) forming a water-in oil-in-water emulsion by dispersing the water-in-oil emulsion into an aqueous phase; and (c) initiating polymerization preferably by application of heat (or radiation).

Acid-free hollow microspheres may also be prepared by a simpler ("one-step") emulsification process comprising aqueous suspension polymerization of at least one alkyl acrylate or alkyl methacrylate ester monomer and at least one non-ionic nitrogen containing polar monomer in the presence of at least one emulsifier which is capable of producing a water-in-oil emulsion inside the droplets, as defined below, which is substantially stable during emulsification and polymerization. Both methods produce an aqueous suspension of monomer droplets which upon polymerization become microspheres, a majority of which have multiple interior cavities that, upon drying, become voids.

The following terms have these meanings as used herein:

1. The term "droplet" means the liquid stage of the microspheres prior to the completion of polymerization.
2. The term "cavity" means a space within the walls of a droplet or microsphere when still in the suspension or dispersion medium prior to drying, and thus containing whatever medium was used.
3. The term "void" means an empty space completely within the walls of a polymerized microsphere.
4. The term "hollow" means containing at least one void or cavity.
5. The term "acid free" means the monomers utilized contain no proton-donating species, specifically no carboxylic or sulphonic acid groups.

All percents, parts, and ratios described herein are by weight unless specifically stated otherwise.

DETAILED DESCRIPTION OF THE INVENTION

Alkyl acrylate or methacrylate monomers useful in preparing the hollow microspheres and pressure sensitive adhesives of this invention are those monofunctional unsaturated acrylate or methacrylate esters of non tertiary alkyl alcohols, the alkyl groups of which have from 4 to about 14 carbon atoms. Such acrylates are oleophilic, water emulsifiable, have restricted water solubility, and as homopolymers, generally have glass transition temperatures below about $-20°$ C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof Acrylate or methacrylate or other vinyl monomers which, as homopolymers, have glass transition temperatures higher than about $-20°$ C., e.g., tert-butyl acrylate, isobornyl acrylate, butyl methacrylate, vinyl acetate, and the like, may be utilized in conjunction with one or more of the acrylate or methacrylate monomers provided that the glass transition temperature of the resultant polymer is below about $-20°$ C. When methacrylate monomer is the sole alkyl acrylate utilized, a crosslinking agent, infra, must be included.

Nitrogen-containing polar monomers suitable for copolymerization with the acrylate or methacrylate monomers to produce acid-free hollow microspheres are those nitrogen-containing polar monomers which are both somewhat oil-soluble and water-soluble, resulting in a distribution of the polar monomer between the aqueous and the oil phases.

Representative examples of suitable nitrogen-containing polar monomers include N-vinyl-2-pyrrolidone, N-vinyl caprolactam, 2-vinyl-4,4-dimethyl-2-oxazolin-5-one (vinyl azlactone), acrylamide, t-butyl acrylamide, dimethylaminoethyl methacrylate, and N-octyl acrylamide.

The hollow microspheres of this invention and the pressure-sensitive adhesives made therefrom comprise at least about 70 parts by weight of at least one alkyl acrylate or alkyl methacrylate ester and correspondingly, up to about 30 parts by weight of one or more nitrogen-containing polar monomers. Preferred microspheres contain at least about 85 parts by weight of the alkyl acrylate, and up to about 15 parts by weight of the nitrogen-containing polar monomer. At least one nitrogen-containing polar monomer is included in the composition. For most nitrogen-containing polar monomers, incorporation of from about 1 part to about 15 parts by weight is preferred, as this ratio provides hollow microspheres with balanced pressure-sensitive adhesive properties.

Aqueous suspensions of the hollow microspheres may be prepared by a "two-step" emulsification process which first involves forming a water-in-oil emulsion of an aqueous solution of nitrogen-containing polar monomer(s) in oil phase monomer, i.e., at least one acrylate or methacrylate ester, using an emulsifier having a low hydrophilic-lipophilic balance (HLB) value. Suitable emulsifiers are those having an HLB value below about 7, preferably in the range of about 2 to about 7. Examples of such emulsifiers include sorbitan monooleate, sorbitan trioleate, and ethoxylated oleyl alcohol such as Brij TM 93, available from Atlas Chemical Industries, Inc. Thus, in this first step, oil phase monomer(s), emulsifier, a free radical initiator, and, optionally, a crosslinking monomer or monomers as defined below are combined, and an aqueous solution of all or a portion of the polar monomer(s) is agitated and poured into the oil phase mixture to form a water in oil emulsion. A thickening agent, e.g., methyl cellulose may also be included in the aqueous phase of the water-in-oil emulsion. In the second step, a water-in-oil in water emulsion is formed by dispersing the water-in-oil emulsion of the first step into an aqueous phase containing an emulsifier having an HLB value above about 6. The aqueous phase may also contain any portion of the polar monomer(s) which was not added in step one. Examples of such emulsifiers include ethoxylated sorbitan monooleate, ethoxylated lauryl alcohol, and alkyl sulfates. In both steps, when an emulsifier is utilized, its concentration should be greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^{-4}$ to about 3.0 moles/liter. Additional detail concerning the preparation of water-in-oil-in-water emulsions, i.e., multiple emulsions, may be found in various literature references, e.g., *Surfactant Systems: Their Chemistry, Pharmacy, & Biology,* (D. Attwood and A. T. Florence, Chapman & Hall Limited, New York, N.Y., 1983). The final process step of this method of the invention involves the application of heat or radiation to initiate polymerization of the monomers. Useful initiators are those which are normally suitable for free radical polymerization of acrylate monomers and which are oil-soluble and of very low solubility in water. However, when the nitrogen-containing polar monomer is N-vinyl pyrrolidone, the use of benzoyl peroxide as the initiator is recommended Examples of such initiators include thermally-activated initiators such as azo compounds, hydroperoxides, peroxides, and the like, and photoinitiators such as benzophenone, benzoin ethyl ether, and 2,2-dimethoxy-2 phenyl acetophenone. Use of a water-soluble polymerization initiator causes formation of substantial amounts of latex. The extremely small particle size of latex particles renders any significant formation of latex undesirable The initiator is generally used in an amount ranging from about 0.01 percent up to about 10 percent by weight of the total polymerizable composition, preferably up to about 5 percent.

Aqueous suspensions of hollow acid-free microspheres may also be prepared by a "one-step" emulsification process comprising aqueous suspension polymerization of at least one alkyl acrylate or alkyl methacrylate ester monomer and at least one nitrogen-containing polar monomer in the presence of at least one emulsifier capable of producing a water-in-oil emulsion inside the droplets which is substantially stable during emulsification and polymerization. As in the two-step emulsification process, the emulsifier is utilized in concentrations greater than its critical micelle concentration. In general, high HLB emulsifiers are required, i.e., emulsifiers having an HLB value of at least about 25, will produce stable cavity-containing droplets during the polymerization, and are suitable for use in this one-step process. Examples of such emulsifiers include alkylarylether sulfates such as sodium alkylarylether sulfate, e.g., Triton TM W/30, available from Rohm and Haas, alkylarylpolyether sulfates such as alkylarylpoly(ethylene oxide) sulfates, preferably those having up to about 4 ethyleneoxy repeat units, and alkyl sulfates such as sodium lauryl sulfate, ammonium lauryl sulfate, triethanolamine lauryl sulfate, and sodium hexadecyl sulfate, alkyl ether sulfates such as ammonium lauryl ether sulfate, and alkylpolyether sulfates such as alkyl poly(ethylene oxide) sulfates, preferably those having up to about 4 ethyleneoxy units. Alkyl sulfates, alkyl ether sulfates, and alkylarylether sulfates are preferred as they provide a maximum number of voids per microsphere for a minimum amount of surfactant. Polymeric stabilizers may also be present but are not necessary.

The composition may also contain a crosslinking agent such as a multifunctional (meth)acrylate, e.g., butanediol diacrylate or hexanediol diacrylate, or other multifunctional crosslinker such as divinylbenzene. When used, crosslinker(s) is (are) added at a level of up to about 0.5 mole percent, preferably up to about 0.1 mole percent, of the total polymerizable composition.

The hollow acid-free microspheres of the invention are normally tacky, elastomeric, insoluble but swellable in organic solvents, and small, typically having diameters of at least about 1 micrometer, preferably in the range of about 1 to about 250 micrometers. The majority of the hollow acid-free microspheres prepared by the methods of this invention contain multiple voids, a majority of the voids having a diameter which is less than about 10% of the diameter of the microsphere, the total of all the void diameters being at least about 10% of the diameter of the microsphere, preferably at least about 20%, more preferably at least about 30%.

Following polymerization, an aqueous suspension of the hollow microspheres is obtained which is stable to agglomeration or coagulation under room temperature conditions. The suspension may have non-volatile solids contents of from about 10 to about 50 percent by weight. Upon prolonged standing, the suspension separates into two phases, one phase being aqueous and substantially free of polymer, the other phase being an aqueous suspension of microspheres having multiple cavities which, upon drying, become voids. Both phases may contain a minor portion of small latex particles. Decantation of the microsphere-rich phase provides an aqueous suspension having a non-volatile solids content on the order of about 40–50 percent which, if shaken with water, will readily redisperse. If desired, the aqueous suspension of hollow microspheres may be utilized immediately following polymerization to provide inherently tacky pressure-sensitive adhesive coatings. The suspension may be coated on suitable flexible or inflexible backing materials by conventional coating techniques such as knife coating or Meyer bar coating or use of an extrusion die.

Alternatively, the aqueous suspension may be coagulated with polar organic solvents such as methanol, with ionic emulsifiers having a charge opposite to that of the emulsifier used in the polymerization process, or with saturated salt solutions, or the like, followed by washing and drying. The dried hollow microspheres, with sufficient agitation, will readily disperse in common organic liquids such as ethyl acetate, tetrahydrofuran, heptane, 2-butanone, benzene, cyclohexane, and esters, although it is not possible to resuspend them in water. Solvent dispersions of the hollow microspheres may also be coated on suitable backing materials by conventional coating techniques, as described above for aqueous suspensions.

Suitable backing materials for the aqueous or solvent based coatings include paper, plastic films, cellulose acetate, ethyl cellulose, woven or nonwoven fabric formed of synthetic or natural materials, metal, metallized polymeric film, ceramic sheet material, and the like. Primers or binders may be used, but they are not required.

Suspensions or dispersions of the hollow acid-free microspheres in a liquid medium, e.g., water or an organic liquid as described above, may be sprayed by conventional techniques without cobwebbing or may be incorporated in aerosol containers with suitable propellants such as alkanes, alkenes, or chlorofluorocarbons, e.g., Freons TM. The hollow acid-free microspheres of the invention provide a repositionable pressure-sensitive adhesive, i.e., a pressure-sensitive adhesive having a degree of adhesion which permits separation, repositioning, and rebonding.

Useful aerosol formulae have a solids content of from about 5% to about 20%, preferably from about 10% to about 16%.

The pressure-sensitive adhesive properties of the acid-free hollow microspheres may be altered by addition of tackifying resin and/or plasticizer. Preferred tackifiers for use herein include hydrogenated rosin esters commercially available from companies such as Hercules Inc., under such trade names as Foral TM, and Pentalyn TM. Individual tackifiers include Foral TM 65, Foral TM 85, and Foral TM 105. Other useful tackifiers include those based on t-butyl styrene. Useful plasticizers include dioctyl phthalate, 2-ethyl hexyl phosphate, tricresyl phosphate, and the like.

It is also within the scope of this invention to include various other components, such as pigments, fillers, stabilizers, or various polymeric additives.

These and other aspects of the invention are illustrated by the following examples which should not be viewed as limiting in scope.

TEST METHODS

Peel Adhesion

Peel adhesion is the force required to remove a coated flexible sheet material from a test panel measured at a specific angle and rate of removal In the examples, this force is expressed in grams per centimeter (cm) width of coated sheet. The procedure followed is:

A strip 1.27 cm in width of the coated sheet is applied to the horizontal surface of a clean glass test plate with at least 12.7 lineal cm in firm contact A 2 kg hard rubber roller is used to apply the strip. The free end of the coated strip is doubled back nearly touching itself so the angle of removal will be 180°. The free end is attached to the adhesion tester scale. The glass test plate is clamped in the jaws of a tensile testing machine which is capable of moving the plate away from the scale at a constant rate of 2.3 meters per minute. The scale reading in grams is recorded as the tape is peeled from the glass surface. The data is reported as the average of the range of numbers observed during the test.

Shear Strength

The shear strength is a measure of the cohesiveness or internal strength of an adhesive It is based upon the amount of force required to pull an adhesive strip from a standard flat surface in a direction parallel to the surface to which it has been affixed with a definite pressure. It is measured in minutes required to pull a standard area of adhesive coated sheet material from a stainless steel test panel under stress of a constant, standard load.

The tests were conducted on strips of coated sheet material applied to a stainless steel panel such that a 1.27 cm by 1.27 cm portion of each strip was in firm contact with the panel with one end portion of the tape being free. The panel with the coated strip attached was held in a rack such that the panel formed an angle of 178° with the extended tape free end which was tensioned by application of a force of 200 grams applied as a hanging weight from the free end of the coated strip. The 2° less than 180° is used to negate any peel forces, thus insuring that only the shear forces are measured, in an attempt to more accurately determine the holding power of the tape being tested. The time elapsed for each coated film to separate from the test panel was recorded as the shear strength.

EXAMPLE 1

In a one-liter reactor equipped with mechanical stirrer, condenser, and inlet-outlet lines for vacuum and argon, 450 grams of deionized water, 135 grams of isooctyl acrylate, 15 grams of N-vinyl-2-pyrrolidone, 0.04 gram of 1,4-butanediol diacrylate and 0.5 gram of benzoyl peroxide were charged. Vacuum was applied to evacuate the reactor atmosphere, and the reactor was then purged with argon. The agitation was set to 400 RPM and when the initiator had dissolved 1.5 grams of ammonium lauryl sulfate (Standapol TM A, Henkel AG) were added. The temperature of the reactor was raised to 60° C. and maintained for 22 hours. An argon purge was maintained during the polymerization. After the 22-hour period, the suspension was allowed to cool to room temperature. The reactor was then emptied and the suspension filtered. Optical microscopy showed hollow microspheres from about 10 to 85 micrometers in diameter suspended in water. The majority of the microspheres contained multiple inclusions at least about 2 micrometers in diameter.

EXAMPLES 2–7

These examples illustrate the use of N-vinyl-2-pyrrolidone in different amounts and with different acrylates to prepare hollow, tacky elastomeric microspheres using the type of equipment and polymerization technique outlined in Example 1. Details of the compositions are listed in Table I. For these examples the initiator was benzoyl peroxide (0.5 gram) and the surfactant was ammonium lauryl sulfate (1.5 grams). All polymerizations produced aqueous suspensions of hollow microspheres. The microspheres contained multiple inclusions at least about 2 microns in diameter.

TABLE I

| Example | Monomers |
|---|---|
| 2 | 135 g isooctyl acrylate |
|   | 15 g N-vinyl-2-pyrrolidone |
|   | 0.08 g 1,4-butanediol diacrylate |

TABLE I-continued

| Example | Monomers |
|---|---|
| 3 | 127.5 g isooctyl acrylate |
|   | 22.5 g N-vinyl-2-pyrrolidone |
|   | 0.04 g 1,4-butanediol diacrylate |
| 4 | 112.5 g isooctyl acrylate |
|   | 37.5 g N-vinyl-2-pyrrolidone |
|   | 0.04 g 1,4-butanediol diacrylate |
| 5 | 105 g isooctyl acrylate |
|   | 45 g N-vinyl-2-pyrrolidone |
|   | 0.04 g 1,4-butanediol diacrylate |
| 6 | 135 g 2-ethylhexyl acrylate |
|   | 15 g N-vinyl-2-pyrrolidone |
| 7 | 67.5 g isooctyl acrylate |
|   | 75 g n-butyl acrylate |
|   | 7.5 g N-vinyl-2-pyrrolidone |
|   | 0.08 g trimethylolpropane trimethacrylate |

EXAMPLES 8–13

These examples illustrate the use of different N-containing polar monomers to prepare hollow tacky microspheres. The equipment and technique used to prepare the microsphere suspensions were similar to those described in Example 1. In these examples the initiator used was benzoyl peroxide (0.5 gram) except for Example 9 where 0.5 g of 2,2'-azobis(2,4-dimethylpentane nitrile), available from DuPont as Vazo TM -52 initiator was used. The surfactant in all examples was ammonium lauryl sulfate (1.5 grams) except for Example 12 where 1.0 g of sodium cetyl sulfate was used. Monomer compositions are shown in Table II.

TABLE II

| Example | Monomers |
|---|---|
| 8 | 135 g isooctyl acrylate |
|   | 15 g vinyl caprolactam |
|   | 0.04 g 1,4-butanediol diacrylate |
| 9 | 135 g isooctyl acrylate |
|   | 15 g 2-vinyl-4,4-dimethyl-2-oxazolin-5-one |
|   | 0.08 g divinyl benzene |
| 10 | 144 g isooctyl acrylate |
|    | 6 g dimethylaminoethyl methacrylate |
|    | 0.04 g 1,6-hexanediol diacrylate |
| 11 | 141 isooctyl acrylate |
|    | 9 g octyl acrylamide |
|    | 0.02 g tetraethylene glycol dimethacrylate |
| 12 | 120 g 2-ethylhexyl acrylate |
|    | 15 g n-butyl acrylate |
|    | 7.5 g N-vinyl-2-pyrrolidone |
|    | 7.5 g 2-vinyl-4,4-dimethyl-2-oxazolin-5-one |
|    | 0.02 g trimethylolpropane trimethacrylate |
| 13 | 127.5 g isodecyl acrylate |
|    | 22.5 g N-vinyl caprolactam |
|    | 0.08 g divinyl benzene |

EXAMPLE 14

The microspheres of Example 1 were coagulated and dispersed in isopropanol at 12 wt% solids. The solvent dispersion was coated on 100# weight white paper and dried. The microsphere pressure sensitive adhesive dry coating weight was 18 g/m$^2$. The microsphere coated paper and an acid-sensitive substrate were repeatedly attached to each other and separated. A 90° peel adhesion of 67.3 g/cm was recorded. Adhesion and removability were good. No transfer of microspheres or damage to the acid sensitive substrate was observed.

EXAMPLES 15 to 21

Microspheres prepared in the examples shown in Table III were coagulated and dispersed in isopropanol or isopropanol/heptane mixtures and coated on a 37- micron thick poly(ethylene terephthalate) film. The coatings were dried in an oven at 65° C for 10 minutes and left in a constant humidity (50% relative humidity) and temperature (22.2° C.) room overnight. The coated samples were tested for peel adhesion and shear strength Results are shown in Table III. Examples 16, 17, 19, and 20 show excellent shear performance. Examples 16 and 17, which have high levels of the N-containing polar monomer show exceptional shear performance for a repositionable adhesive.

TABLE III

| Example | Microsphere Example | Coating Weight (g/m$^2$) | Peel Adhesion (g/cm) | Shear Strength (minutes) |
|---|---|---|---|---|
| 15 | 1 | 5 | 124.3 | 6.0 |
| 16 | 3 | 5 | 191.3 | >3,000.0 |
| 17 | 5 | 5 | 105.6 | >3,000.0 |
| 18 | 7 | 9 | 69.2 | 11.0 |
| 19 | 8 | 7 | 259.6 | 32.0 |
| 20 | 9 | 5 | 205.4 | 493.5 |
| 21 | 10 | 7 | 152.5 | 7.5 |

What is claimed is:

1. A process for preparing an aqueous suspension comprising hollow, polymeric, acrylate, inherently tacky, infusible, solvent-insoluble, solvent-dispersible, elastomeric, nitrogen-containing, acid-free pressure-sensitive adhesive microspheres having an average diameter of at least about 1 micrometer wherein a majority of said microspheres contain multiple interior voids, a majority of said voids having a diameter of less than about 10% of the diameter of the microsphere, the total of the void diameters being at least about 10% of the diameter of said hollow microsphere, said process comprising the steps of:
   (a) forming a water-in-oil emulsion of a water phase selected from the group consisting of water and aqueous solutions of at least one nitrogen-containing polar monomer in at least one oil phase monomer selected from the group consisting of alkyl acrylate and alkyl methacrylate esters;
   (b) forming a water-in-oil-in-water emulsion by dispersing the water-in-oil emulsion into an aqueous phase containing an emulsifier having a hydrophilic-lipophilic balance value of at least about 6; and
   (c) initiating polymerization.

2. A process according to claim 1 wherein the water-in-oil emulsion further comprises an emulsifier having a hydrophilic-lipophilic balance value of less than about 7.

3. A process according to claim 1 wherein polymerization is initiated by means of exposure to radiation.

4. A process according to claim 1 wherein polymerization is initiated by means of exposure to heat.

5. A process for preparing an aqueous suspension comprising hollow, polymeric, acrylate, inherently tacky, infusible, solvent-insoluble, solvent-dispersible, elastomeric, nitrogen-containing, acid-free pressure-sensitive adhesive microspheres having an average diameter of at least about 1 micrometer wherein a majority of said microspheres contain multiple interior voids, a majority of said voids having a diameter of less than about 10% of the diameter of the microsphere, the total of the void diameters being at least about 10% of the diameter of said hollow microsphere, said process comprising the steps of:
   (a) forming droplets by mixing together
      (i) at least one monomer selected from alkyl acrylate esters and alkyl methacrylate esters,
      (ii) at least one nitrogen-containing polar monomer, and,
      (iii) at least one emulsifier which is capable of producing a water-in-oil emulsion inside said droplets, said emulsion being substantially stable during emulsification and polymerization.
   (b) initiating polymerization.

6. A process according to claim 5 wherein said emulsifier has an HLB value of at least about 25.

7. A process according to claim 5 wherein polymerization is initiated by means of exposure to radiation.

8. A process according to claim 5 wherein polymerization is initiated by means of exposure to heat.

* * * * *